(12) United States Patent
Kim et al.

(10) Patent No.: US 10,371,875 B2
(45) Date of Patent: Aug. 6, 2019

(54) DISPLAY DEVICE HAVING A COLOR CONVERSION LAYER

(71) Applicant: SAMSUNG DISPLAY CO., LTD., Yongin, Gyeonggi-Do (KR)

(72) Inventors: Dong Uk Kim, Hwaseong-si (KR); Min Ki Nam, Anseong-si (KR); Hae Il Park, Seoul (KR); Jun Han Lee, Incheon (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 414 days.

(21) Appl. No.: 14/717,431

(22) Filed: May 20, 2015

(65) Prior Publication Data
US 2016/0062178 A1  Mar. 3, 2016

(30) Foreign Application Priority Data
Sep. 3, 2014 (KR) ........................ 10-2014-0117019

(51) Int. Cl.
G02B 1/00 (2006.01)
G02B 5/02 (2006.01)
B82Y 20/00 (2011.01)
G02F 1/1335 (2006.01)

(52) U.S. Cl.
CPC .......... *G02B 5/0242* (2013.01); *G02B 1/005* (2013.01); *G02F 1/133602* (2013.01); *B82Y 20/00* (2013.01); *G02F 1/133603* (2013.01); *G02F 2001/133614* (2013.01); *G02F 2202/32* (2013.01); *Y10S 977/774* (2013.01)

(58) Field of Classification Search
USPC .................... 349/24, 25, 69–71, 106, 110
See application file for complete search history.

(56) References Cited

U.S. PATENT DOCUMENTS

| | | | |
|---|---|---|---|
| 9,581,759 B2* | 2/2017 | Kim | G02F 1/133603 |
| 2006/0244872 A1* | 11/2006 | Kim | G02F 1/133514 349/25 |
| 2009/0224177 A1* | 9/2009 | Kinomoto | C09K 11/7721 250/484.4 |
| 2012/0044443 A1 | 2/2012 | Han et al. | |

(Continued)

FOREIGN PATENT DOCUMENTS

KR 10-2007-0114924 A 12/2007
KR 10-0785412 B1 12/2007

(Continued)

OTHER PUBLICATIONS

Wei-Fang Su, Ya-Ching Fu, Wei-Ping Pan, "Thermal properties of high refractive index epoxy resin system", Thermochimica Acta, vols. 392-393, pp. 385-389 (Year: 2002).*

(Continued)

*Primary Examiner* — Edward J Glick
*Assistant Examiner* — David Y Chung
(74) *Attorney, Agent, or Firm* — Lee & Morse, P.C.

(57) ABSTRACT

A display device may include a substrate and a plurality of color conversion units on the substrate. Each of the plurality of color conversion units may include a photonic crystal layer having at least two layers having different refractive indices alternately stacked, and a wavelength shifter dispersed in at least one of the at least two layers.

17 Claims, 8 Drawing Sheets

(56) References Cited

U.S. PATENT DOCUMENTS

| | | | | |
|---|---|---|---|---|
| 2012/0205701 A1* | 8/2012 | Sasaki | ................. | H01L 51/5218 |
| | | | | 257/98 |
| 2014/0160408 A1* | 6/2014 | Cho | ................. | G02F 1/133617 |
| | | | | 349/110 |
| 2014/0192294 A1* | 7/2014 | Chen | ......................... | F21V 9/08 |
| | | | | 349/69 |
| 2015/0124188 A1* | 5/2015 | Kadowaki | ......... | G02F 1/133553 |
| | | | | 349/42 |
| 2016/0061417 A1* | 3/2016 | Kim | ................. | G02F 1/133603 |
| | | | | 349/62 |
| 2017/0137706 A1* | 5/2017 | Fujita | ..................... | C09K 11/08 |

FOREIGN PATENT DOCUMENTS

| | | |
|---|---|---|
| KR | 10-2010-0089606 A | 8/2010 |
| KR | 10-2012-007672 A | 2/2012 |

OTHER PUBLICATIONS

Scientific Polymer Products, Inc., https://scientificpolynner.com/technical-library/refractive-index-of-polymers-by-index (Year: 2013).*

Jonathan P. Dowling et al., "The Photonic Band Edge Laser: A New Approach to Gain Enhancement", Journal of Applied Physics, vol. 75, Feb. 1994, pp. 1896-1899.

* cited by examiner

DISPLAY DEVICE HAVING A COLOR CONVERSION LAYER

CROSS-REFERENCE TO RELATED APPLICATION

Korean Patent Application No. 10-2014-0117019, filed on Sep. 3, 2014, in the Korean Intellectual Property Office, and entitled: "Display Device Comprising Color Conversion Layer," is incorporated by reference herein in its entirety.

BACKGROUND

1. Field

Exemplary embodiments relate to a display device including a color conversion layer.

2. Description of the Related Art

A display device includes an element that emits light so as to display an image. Recently, flat panel displays ("FPDs") have been widely used as a display device and include, for example, liquid crystal displays ("LCDs") and organic light emitting diode ("OLED") displays.

A display device includes a color filter or a color conversion layer so as to display desired colors. The color filter passes a desired color so that the desired color may be displayed and the color conversion layer converts wavelength of light entering the color conversion layer into a desired color of light so that the desired color may be displayed.

In order to increase efficiency of a display device including a color filter or a color conversion layer, it is first required for the color filter or the color conversion layer to have improved efficiency.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

According to an exemplary embodiment, a display device includes a substrate and a plurality of color conversion units on the substrate. Each of the plurality of color conversion units may include a photonic crystal layer having at least two layers that have different refractive indices alternately stacked, and a wavelength shifter dispersed in at least one of the at least two layers.

The plurality of color conversion units may further include a green conversion unit to absorb blue light and emit green light, and a red conversion unit to absorb blue light and emit red light.

The wavelength shifter may be a phosphor or a quantum dot (QD).

The at least two layers may include a first layer having a refractive index in a range of 1.3 to 1.9, and a second layer having a refractive index in a range of 1.5 to 2.5.

When the first layer has a thickness of d1 and a refractive index of n1, and a wavelength of light emitted from the photonic crystal layer is λ, the following equation may be satisfied:

$$n1 \times d1 = m1 \times (\lambda/2)$$

where m1 is a natural number.

When the second layer has a thickness of d2 and a refractive index of n2, and a wavelength of light emitted from the photonic crystal layer is λ, the following equation may be satisfied:

$$n2 \times d2 = m2 \times (\lambda/2)$$

where m2 is a natural number.

The display device may further include a light scatterer dispersed at least one of the at least two layers.

The display device may further include a black matrix to partition the green conversion unit and the red conversion unit into pixels.

The display device may further include a thin film transistor layer on the color conversion layer.

According to another exemplary embodiment, a liquid crystal display includes a first substrate, a plurality of color conversion units on the first substrate, a second substrate opposite the first substrate, and a liquid crystal layer between the first and second substrates. Each of the plurality of color conversion units may include a photonic crystal layer of at least two layers having different refractive indices alternately stacked, and also include a wavelength shifter dispersed in at least one of the at least two layers.

The plurality of color conversion layers may further include a green conversion unit to absorb blue light and emit green light and a red conversion unit to absorb blue light and emit red light.

The wavelength shifter may be a phosphor or a quantum dot (QD).

The photonic crystal layer may include a first layer having a refractive index in a range of 1.3 to 1.9; and a second layer having a refractive index in a range of 1.5 to 2.5.

The liquid crystal display may further include a light scatterer dispersed in at least one of the at least two layers.

The liquid crystal display may further include a black matrix disposed on the first substrate and configured to partition the green conversion unit and the red conversion unit into pixels.

The liquid crystal display may further include a thin film transistor layer on the color conversion layer.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
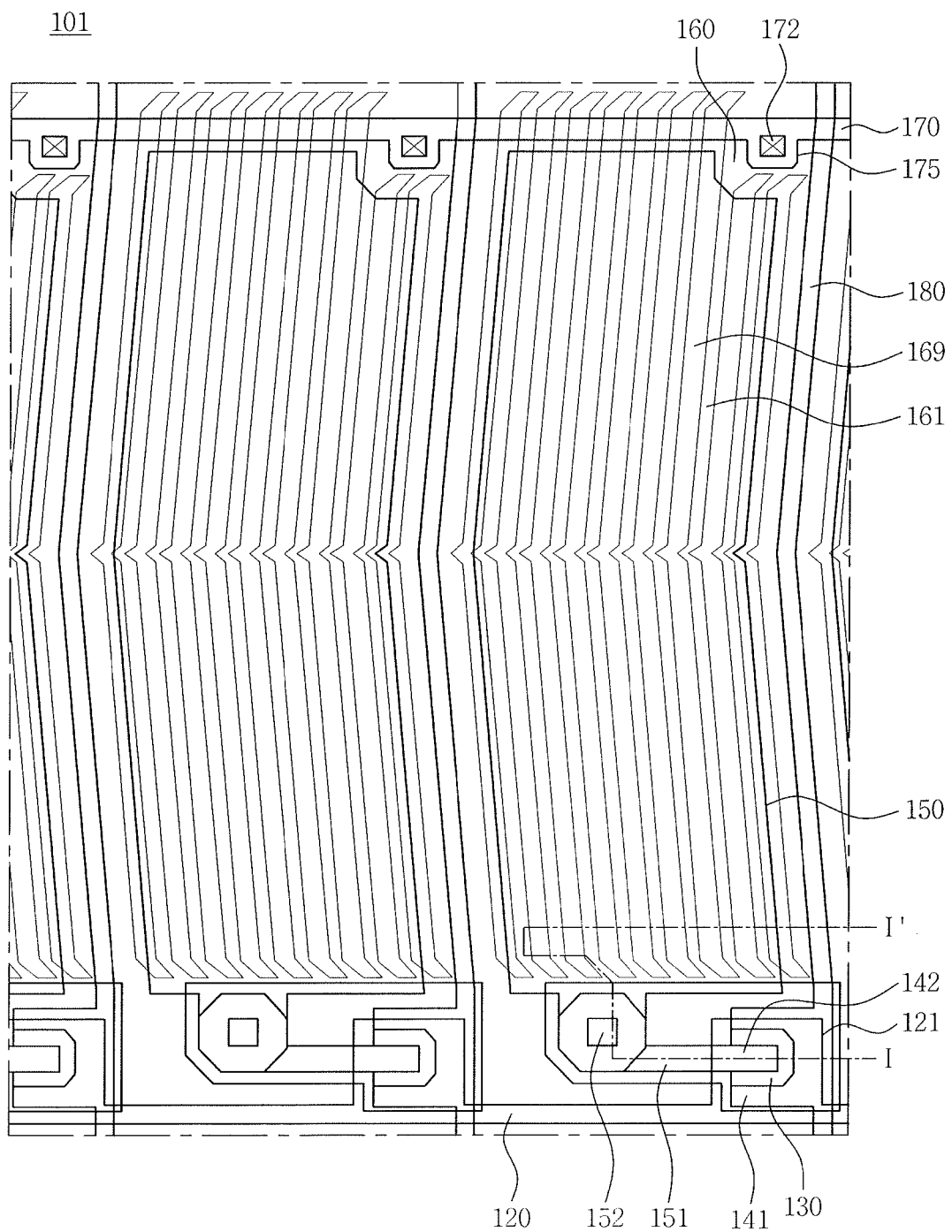
FIG. 1 illustrates a plan view of a liquid crystal display according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

In the drawings, certain elements or shapes may be simplified or exaggerated to better illustrate the embodiments, and other elements present in an actual product may also be omitted. Thus, the drawings are intended to facilitate the understanding. Like reference numerals refer to like elements throughout the specification.

In addition, when a layer or element is referred to as being "on" another layer or element, the layer or element may be directly on the other layer or element, or one or more intervening layers or elements may be interposed therebetween. As used herein, "connected" may refer to elements being physically and/or electrically connected to each other. As used herein, the term "and/or" includes any and all combinations of one or more of the associated listed items.

Hereinafter, a first exemplary embodiment will be described in detail with reference to FIGS. 1 to 3.

FIG. 1 is a plan view illustrating a liquid crystal display ("LCD") 101 according to the first exemplary embodiment. FIG. 2 is a cross-sectional view taken along line I-I' of FIG. 1. FIG. 3 is a schematic diagram illustrating the LCD 101.

Figure 2:
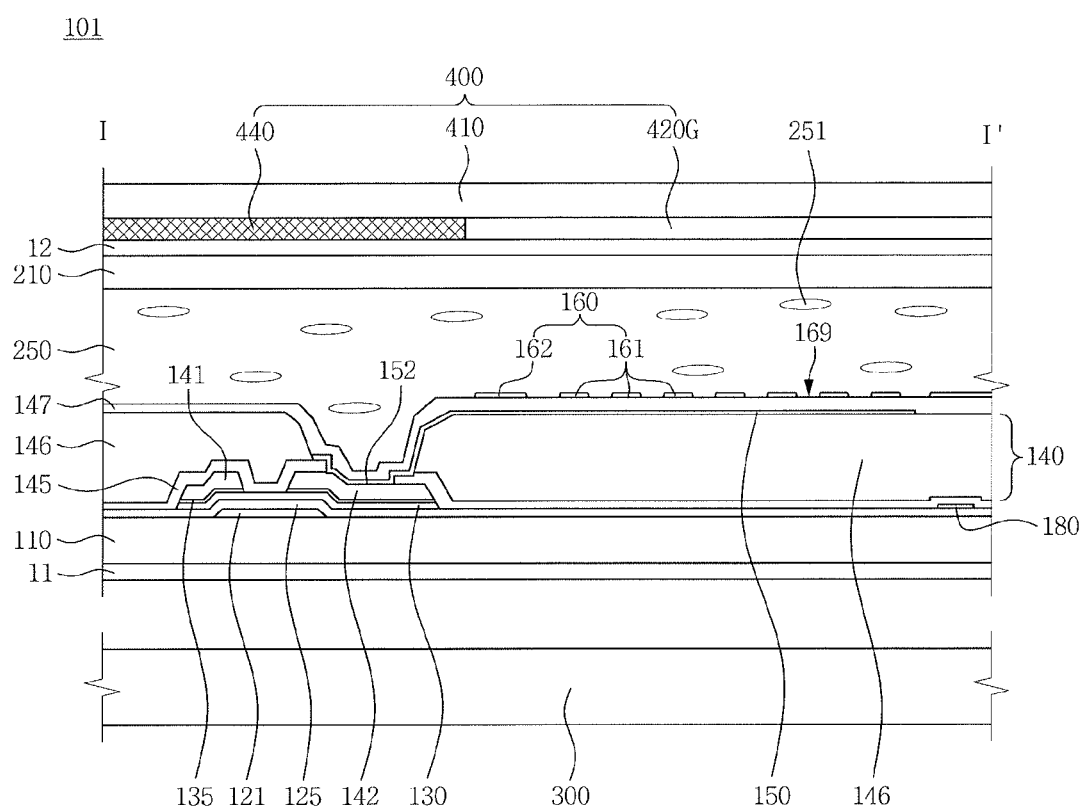
FIG. 2 illustrates a cross-sectional view taken along line I-I' of FIG. 1.
Figure 3:
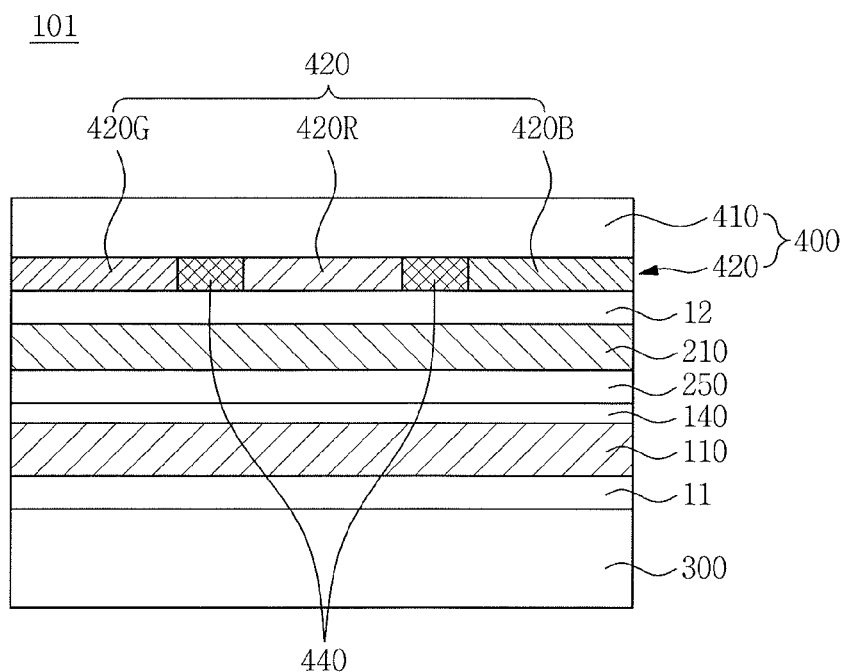
FIG. 3 illustrates a schematic diagram of the liquid crystal display according to the first exemplary embodiment.

The LCD 101 illustrated in FIGS. 1 to 3 may include a first substrate 110 and a second substrate 210, which oppose each other, and also include a liquid crystal layer 250 between the first and second substrates 110 and 210. The LCD 101 may further include a backlight unit 300 and a color conversion substrate 400.

The first substrate 110 may include transparent glass, plastic, or the like.

A thin film transistor ("TFT") layer 140 may be on the first substrate 110. The TFT layer 140 may include a gate line 120, a common line 170, a data line 180, and a TFT.

In more detail, the gate line 120 and a gate electrode 121 protruding from the gate line 120 may be on the first substrate 110. The common line 170 may be parallel to the gate line 120 and a contact electrode 175 may protrude from the common line 170. The gate line 120 may transmit a gate signal and the common line 170 may transmit common voltage.

The gate line 120, the gate electrode 121, the common line 170, and the contact electrode 175 may include at least of aluminum (Al), silver (Ag), copper (Cu), molybdenum (Mo), chromium (Cr), tantalum (Ta) and titanium (Ti), and may have a multilayer structure in which two or more conductive layers are stacked, e.g., laminated.

A gate insulating layer 125 including, but not limited to, silicon nitride ($SiN_x$) or silicon oxide ($SiO_x$), may be on the gate line 120 and the gate electrode 121. The gate insulating layer 125 may have a multilayer structure that includes at least two insulating layers which are different from each other in physical or chemical properties.

A semiconductive layer 130 may be disposed on the gate insulating layer 125. The semiconductive layer 130 may include amorphous silicon or polysilicon, or may include a semiconductive oxide. The semiconductive layer 130 overlaps at least a part of the gate electrode 121.

An ohmic contact layer 135 may be on the semiconductive layer 130. The ohmic contact layer 135 may include a material, e.g., such as hydrogenated amorphous silicon doped with phosphorus (P), etc., or may include silicide.

A source electrode 141, a drain electrode 142, and the data line 180 including a conducting material may be on the semiconductive layer 130 and the gate insulating layer 125. The source electrode 141, the drain electrode 142, and the data line 180 may include the same conducting material as the gate line 120 and the gate electrode 121, or may include a different conducting material.

In detail, the source electrode 141, the drain electrode 142, and the data line 180 may include at least one refractory metal, e.g., molybdenum (Mo), chromium (Cr), tantalum (Ta) and titanium (Ti). The source electrode 141, the drain electrode 142, and the data line 180 may have a multilayer structure that includes a refractory metal layer and low resistance conductive layer. The multilayer structure may include, for example, a double layer including a chromium or molybdenum (an alloy thereof) lower layer and an aluminum (an alloy thereof) upper layer, and a triple layer including a molybdenum (an alloy thereof) lower layer, an aluminum (an alloy thereof) intermediate layer, and a molybdenum (an alloy thereof) upper layer, but the embodiments are not limited thereto. The material of the source electrode 141, the drain electrode 142, and the data line 180 may include any of a number of metals or conducting materials suitable for the purpose described herein, besides the above-described materials.

The data line 180 may include a terminal part configured for connection to a different layer or an external driver circuit (not shown). The data line 180 may transmit a data signal and may intersect (or cross) the gate line 120 and the common line 170. The data line 180 may include a bent portion in order to improve transmittance of an LCD, and as illustrated in FIG. 1, the data line 180 may be bent in a V-shape in a central portion of a pixel area of the LCD.

In one exemplary embodiment, the pixel area may be defined by the data line 180 and the gate line 120, but the embodiments are not limited thereto. In an exemplary embodiment, the pixel area may be defined by a black matrix that will be described below. The LCD 101 may include a red pixel, a green pixel, and a blue pixel, and may further include pixels that represent different colors where necessary.

The source electrode 141 may extend from the data line 180 and may overlap the semiconductive layer 130. The drain electrode 142 may be spaced apart from the source electrode 141 and may overlap the semiconductive layer 130.

The TFT may include the gate electrode 121, the source electrode 141, the drain electrode 142, and the semiconductive layer 130. A channel of the TFT may be formed by a portion of the semiconductive layer 130 exposed between the source electrode 141 and the drain electrode 142.

A passivation layer 145 may be disposed on the data line 180, the source electrode 141, the drain electrode 142 and the exposed portion of the semiconductive layer 130.

The passivation layer 145 may include a silicon-based insulating material, e.g., silicon nitride ($SiN_x$) or silicon oxide ($SiO_x$), or may also include an organic insulation material, e.g., a polymer resin. Further, the passivation layer 145 may have excellent insulating properties and may have a multilayer structure including inorganic and organic layers in order to protect the exposed semiconductive layer 130.

A planarization layer 146 may be disposed on the passivation layer 145. The planarization layer 146 may be configured to planarize a light transmission area where first and second electrodes 150 and 160 overlap each other. The planarization layer 146 may also include a silicon-based insulating material, e.g., silicon nitride ($SiN_x$) or silicon oxide ($SiO_x$), or may include an organic insulation material, e.g., a polymer resin.

A contact hole 152 may be defined in the passivation layer 145 and the planarization layer 146, and may expose the drain electrode 142.

The first electrode 150 may be disposed on the planarization layer 146. The first electrode 150 may be connected to the drain electrode 142 via the contact hole 152. In the first exemplary embodiment, the first electrode 150 may act as a pixel electrode in the LCD 101, but the embodiments are not limited thereto.

The first electrode 150 may include a transparent conducting material, e.g., polycrystalline, monocrystalline, or amorphous indium tin oxide ("ITO"), indium zinc oxide ("IZO"), or aluminum doped zinc oxide ("AZO"). The first electrode 150 illustrated in FIG. 1 may be a plane electrode and may have a pair of bent portions.

An insulating layer 147 may be on the first electrode 150. The insulating layer 147 may include silicon nitride ($SiN_x$) or silicon oxide ($SiO_x$), and may have a multilayer structure that includes inorganic and organic layers.

The second electrode 160 may be disposed on the insulating layer 147. The second electrode 160 may be connected to the common line 170 via the contact electrode 175. Thus, a common voltage may be applied to the second electrode 160. A contact hole 172 may be defined in the passivation layer 145, the planarization layer 146, and the insulating layer 147 so that the second electrode 160 and the contact electrode 175 are connected to each other via the contact hole 172. In the first exemplary embodiment according, the second electrode 160 may act as a common electrode in the LCD 101, but the embodiments are not limited thereto.

The second electrode 160 may include a transparent conducting material, e.g., polycrystalline, monocrystalline, or amorphous ITO, IZO or AZO. The LCD may include a plurality of second electrodes 160 respectively disposed in pixels or pixel areas thereof. Second electrodes 160 included in adjacent pixels may be connected to each other.

The second electrode 160 may overlap at least a part of the first electrode 150 and may include a plurality of branch electrodes 161. In an exemplary embodiment of manufacturing a display device, a second electrode-forming material may be applied on the insulating layer 147, and then the applied second electrode-forming material may be selectively removed from the insulating layer 147, thereby forming a plurality of cutout portions 169. As a result, the plurality of branch electrodes 161 may be formed or defined by the plurality of cutout portions 169.

The second electrode 160 may further include a coupling portion 162 to couple the plurality of branch electrodes 161 to each other. The coupling portion 162 may be coupled to branch electrodes 161 of second electrodes 160 included in adjacent pixels.

The second substrate 210 may include transparent glass, plastic, or the like.

Figure 4:
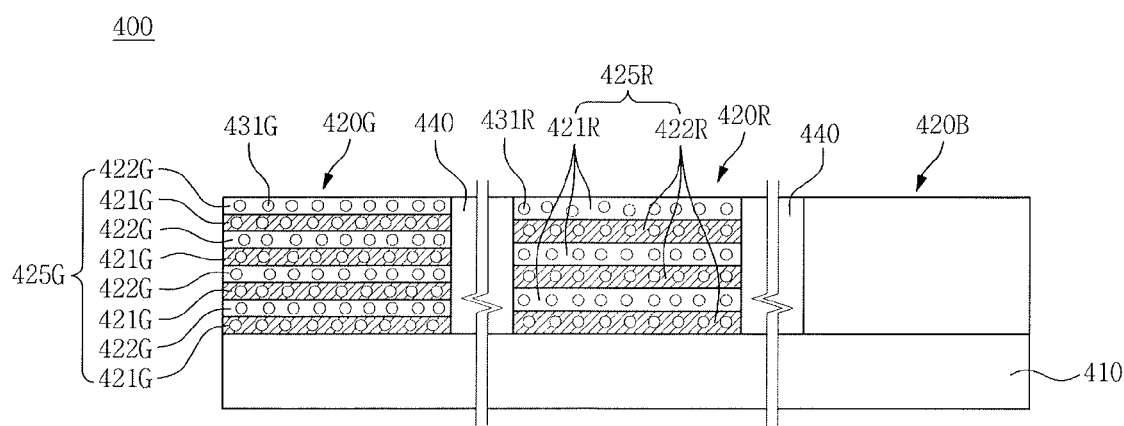
FIG. 4 illustrates a cross-sectional view of a color conversion substrate.

A plurality of color filters and a black matrix may be on the first substrate 110 or on the second substrate 210 (see FIG. 4). The plurality of color filters may be divided or defined by the black matrix. Each color filter may display any one of red, green, and blue, or other colors. The black matrix may divide and separate the plurality of color filters from each other, may define a pixel area, and also may reduce or effectively prevent light leakage. In the first exemplary embodiment, the LCD 101 further includes the color conversion substrate 400. Thus, the color filters may not be disposed directly on the first substrate 110 or the second substrate 210. The black matrix may also be disposed on the color conversion substrate 400.

A spacer (not shown) may be disposed between the first and second substrates 110 and 210, and may support the first and second substrates 110 and 210 and secure a space therebetween.

A liquid crystal 251 may be arranged in the space secured by the spacer, thereby forming the liquid crystal layer 250. Where a voltage is not applied to the first and second electrodes 150 and 160, a long axis of the liquid crystal 251 may be disposed parallel to the first substrate 110. The long axis of the liquid crystal 251 may also be spirally twisted at 90 degrees from a direction of the branch electrode 161 on the first substrate 110 to the second substrate 210.

When a data voltage is applied to the first electrode 150 and a common voltage is applied to the second electrode 160, an electric field may be generated between the first and second electrodes 150 and 160, and the liquid crystal 251 may be rotatably arranged in response to the electric field. Polarization of light passing through the liquid crystal 251 may vary depending on the rotating direction of the liquid crystal 251.

Polarizing films 11 and 12 may be disposed on outer surfaces of the first substrate 110 and the second substrate 210, respectively, in order to selectively transmit specifically polarized light only.

Although not illustrated, a connection member, e.g., a flexible circuit board (FCB), tape carrier package (TCP), and so forth, may be on at least one edge portion of the first substrate 110 or the second substrate 210 so as to connect the TFT layer 140 to a driver circuit.

The backlight unit 300 may be on an outer surface of the first substrate 110 so as to provide the liquid crystal layer 250 with light.

The backlight unit 300 may include a light source, a light guide plate, a reflector, an optical sheet, and so forth. A light emitting diode (LED) assembly may be used as the light source. In an exemplary embodiment, the LED assembly may have a structure in which a plurality of LEDs are spaced apart from one another by a predetermined distance and are mounted to a printed circuit board (PCB). A blue light source may be utilized as the light source, i.e., blue LEDs may be used.

FIG. 4 is a cross-sectional view of the color conversion substrate 400. The color conversion substrate 400 may include a base substrate 410 and a plurality of color conversion layers 420 on the base substrate 410. Herein, the base substrate 410 may also be called a substrate 410.

Each color conversion layer 420 may include photonic crystal layers 425G and 425R in which materials having different refractive indices are alternately stacked, e.g., laminated, and also include wavelength shifters 431G and 431R dispersed in at least one of up to all of the layers of the photonic crystal layers 425G and 425R.

In the first exemplary embodiment, the LCD 101 may use a blue backlight. Accordingly, the color conversion layer 420 of the LCD 101 may include a green conversion unit 420G that absorbs blue light and emits green light, and a red conversion unit 420R that absorbs blue light and emits red light. In this case, the green conversion unit 420G may correspond to a green pixel and the red conversion unit 420R may correspond to a red pixel.

The green conversion unit 420G may include a green wavelength shifter 431G that absorbs blue light and emits green light. The red conversion unit 420R may include a red wavelength shifter 431R that absorbs blue light and emits red light.

The color conversion layer 420 may also include a blue transmission unit 420B through which blue light is transmitted. The blue transmission unit 420B may correspond to a blue pixel. The blue transmission unit 420B may not include a wavelength shifter and/or a color conversion layer.

The wavelength shifters 431G and 431R may be, for example, a phosphor or a quantum dot (QD). The phosphor may comprise a fluorescent material.

The green wavelength shifter 431G may convert blue light supplied from the backlight unit 300 to green light and may emit the converted green light. The green wavelength shifter 431G may be a green phosphor. Examples of the green phosphor include yttrium aluminum garnet (YAG), $(Ca, Sr, Ba)_2SiO_4$, $SrGa_2S_4$, BAM, $\alpha$-SiAlON, $\beta$-SiAlON, $Ca_3Sc_2Si_3O_{12}$, $Tb_3Al_5O_{12}$, $BaSiO_4$, and CaAlSiON, $(Sr1-xBax)Si_2O_2N_2$, which may be used alone or in combination with two or more kinds.

The red wavelength shifter 431R may convert blue light supplied from the backlight unit 300 to red light and may emit the converted red light. The red wavelength shifter 431R may be a red phosphor. Examples of the red phosphor may include $(Ca, Sr, Ba)S$, $(Ca, Sr, Ba)_2Si_5N_8$, $CaAlSiN_3$, $CaMoO_4$, and $Eu_2Si_5N_8$, which may be used alone or in combination with two or more kinds.

The quantum dot, which emits different color light depending on a size thereof, may be used as the green wavelength shifter 431G and the red wavelength shifter 431R.

The quantum dot may have a dual structure including a core and a shell surrounding the core. The core may include at least one of a type II-IV semiconductor, e.g., ZnS, ZnSe, ZnTe, CdS, CdSe, CdTe, HgS, HgSe, and HgTe, a type IV-VI semiconductor, e.g., PbS, PbSe, and PbTe, and a type III-V semiconductor, e.g., AlN, AlP, AlAs, AlSb, GaN, GaP, GaAs, GaSb, InN, InP, InAs, and InSb.

The shell may include at least one of a type II-IV semiconductor, e.g., ZnS, ZnSe, ZnTe, CdS, CdSe, CdTe, HgS, HgSe, and HgTe, a type IV-VI semiconductor, e.g., PbS, PbSe, and PbTe, and a type III-V semiconductor, e.g., GaN, GaP, GaAs, GaSb, InN, InP, InAs, and InSb.

For example, the core may include at least one of CdSe, CdSeS, CdS, CdTe, InP, and PbSe, and the shell may include at least one of CdS, ZnS, CdSe, CdSeS, ZnSe, ZnSeS, CdTe, ZnTe, and PbS.

The wavelength shifters 431G and 431R may be dispersed, e.g., periodically dispersed, in the photonic crystal layers 425G and 425R.

The photonic crystal layers 425G and 425R may include photonic crystals in which two materials having different dielectric constants and refractive indices are periodically arranged such as to enable the photonic crystals to transmit, reflect, or absorb light of a specified wavelength band. A wavelength band of light that is not transmitted through the photonic crystal is called a photonic band gap, and thus the photonic crystal is also called a photonic band gap material.

Figure 5A:
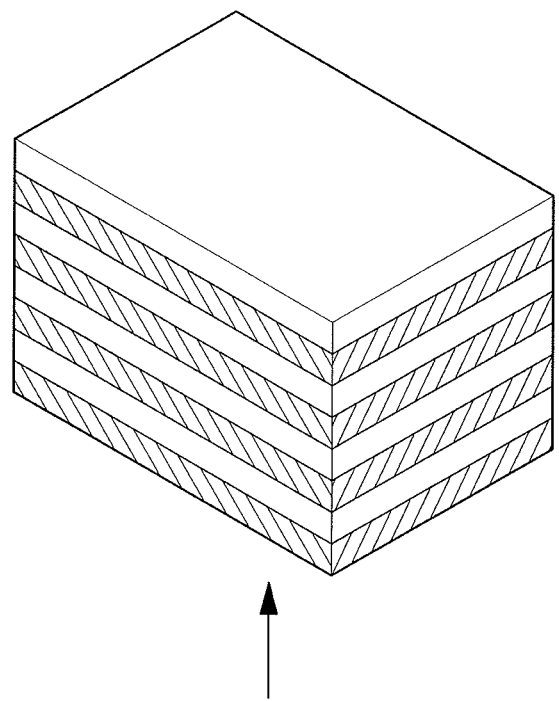
FIGS. 5A to 5C illustrate perspective views of a photonic crystal structure.
Figure 5B:
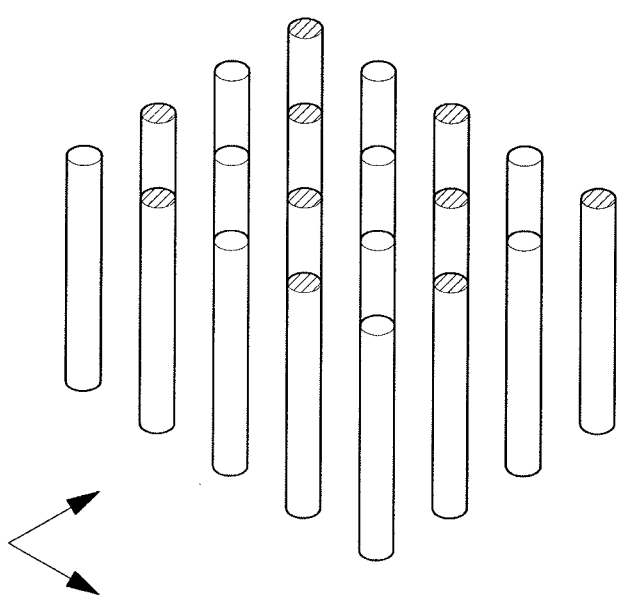
Figure 5C:
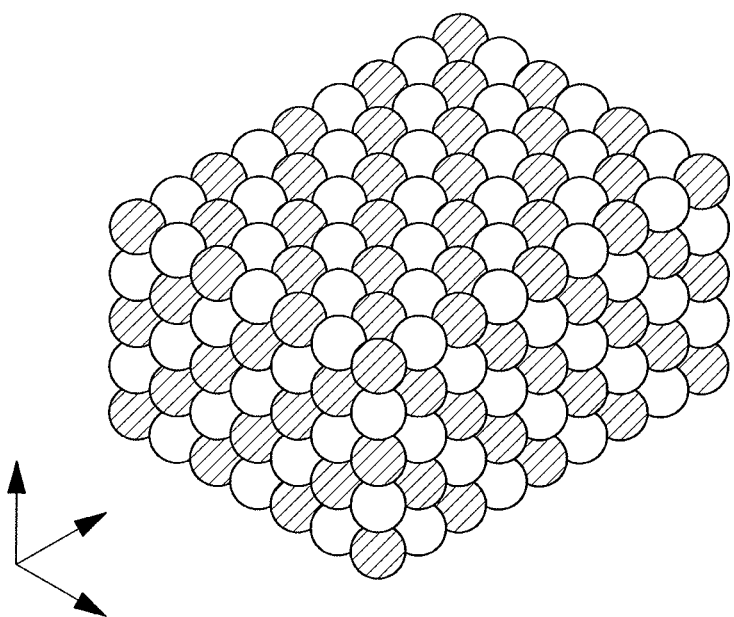

The photonic crystal is classified into a one-dimensional photonic crystal, a two-dimensional photonic crystal, and a three-dimensional photonic crystal according to the direction of periodicity of a structure thereof. In an exemplary embodiment, as illustrated in FIG. 5A, a photonic crystal having periodicity in a single direction as indicated by an arrow may be a one-dimensional photonic crystal. The photonic crystal illustrated in FIG. 5A may have its own optical properties in a single direction indicated by an arrow. As illustrated in FIG. 5B, a photonic crystal having periodicity in two directions may be a two-dimensional photonic crystal, and the photonic crystal illustrated in FIG. 5B may have its own optical properties in two directions indicated by arrows. As illustrated in FIG. 5C, a photonic crystal having periodicity in three directions may be a three-dimensional photonic crystal, and the photonic crystal illustrated in FIG. 5C may have its own optical properties in three directions indicated by arrows.

A transmissive display device using light from a backlight may utilize a transmissive photonic crystal that transmits light of a desired wavelength band and reflects light of the remaining wavelength bands. A reflective display device using ambient light may utilize a reflective photonic crystal that reflects light of a desired wavelength band and transmits light of the remaining wavelength bands.

The optical properties of the photonic crystal may be determined according to a repeating periodic structure of the photonic crystal and refractive indices of the two materials included in the photonic crystal. Thus, a structure of the photonic crystal may be suitably designed to embody a color conversion layer having desired characteristics. Since a design of the photonic crystal is well known in the technical field to which the disclosure pertains, detailed descriptions of the photonic crystal structure will be omitted herein. The following description will focus on exemplary embodiments of a configuration that realizes a display device by using a photonic crystal designed to have desired characteristics in the color conversion layer 420.

The LCD 101 according to the first exemplary embodiment n may include a transmissive photonic crystal layers 425G and 425R that have a one-dimensional photonic crystal structure.

The photonic crystal layers 425G and 425R may include first layers 421G and 421R with a refractive index in a range of 1.3 to 1.9 and second layers 422G and 422R with a refractive index in a range of 1.5 to 2.5.

The first layer 421G of the green conversion unit 420G and the first layer 421R of the red conversion unit 420R may have the same refractive index or may have different refractive indices. In the first exemplary embodiment, the first layer 421G of the green conversion unit 420G and the first layer 421R of the red conversion unit 420R may include the same material and may have the same refractive index.

Similarly, the second layer 422G of the green conversion unit 420G and the second layer 422R of the red conversion unit 420R may have the same refractive index or may have different refractive indices. In the first exemplary embodiment, the second layer 422G of the green conversion unit 420G and the second layer 422R of the red conversion unit 420R may include the same material and may have the same refractive index.

There may be a difference in refractive index in a range of 0.1 to 1.5 between the first layers 421G and 421R and the second layers 422G and 422R. The difference in refractive index may vary when necessary. Due to the difference in refractive index between the first layers 421G and 421R and the second layers 422G and 422R, reflection of light may repeatedly occur at an interface between the first layers 421G and 421R and the second layers 422G and 422R, and light of a specified wavelength band may be emitted through the photonic crystal layers 425G and 425R and light of a different wavelength band may not be transmitted through the photonic crystal layers 425G and 425R.

Generally, for a layer to output light at a desired wavelength λ, the following equation is satisfied:

$$\lambda = 2 \times (n \times d)/m \quad \text{[Equation 1]}$$

where the layer has a thickness of d and a refractive index of n, and m is a natural number.

In an exemplary embodiment, when the first layer 421G of the green conversion unit 420G has a thickness of d1 and a refractive index of n1, and a wavelength of light emitted from the photonic crystal layer 425G is λ, the following equation is satisfied.

$$n1 \times d1 = m1 \times (\lambda/2) \quad \text{[Equation 2]}$$

wherein m1 is a natural number.

Also, when the second layer 422G of the green conversion unit 420G has a thickness of d2 and a refractive index of n2, and wavelength of light emitted from the photonic crystal layer 425G is λ, the following equation is satisfied.

$$n2 \times d2 = m2 \times (\lambda/2) \quad \text{[Equation 3]}$$

wherein m2 is a natural number.

The refractive indices and thicknesses may be adjusted to allow green light only to be transmitted through the green conversion unit 420G. Further, the refractive indices and thicknesses may be adjusted so that the same wavelength of green light is output by both layers.

Similarly, red light only may be transmitted through the red conversion unit 420R by adjusting refractive indices and thicknesses according to Equation 1 of the first and second layers 421R and 422R included in the photonic crystal layer 425R of the red conversion unit 420R.

Where the first layer 421G of the green conversion unit 420G has the same refractive index as the first layer 421R of the red conversion unit 420R, the respective first layers 421G and 421R may have different thicknesses to allow different wavelengths of light to be output therefrom. Further, where the second layer 422G of the green conversion unit 420G has the same refractive index as the second layer 422R of the red conversion unit 420R, the respective second layers 422G and 422R may have different thicknesses to allow different wavelengths of light to be output therefrom.

Thus, in the first exemplary embodiment, the color conversion layer 420 includes the photonic crystal layers 425G and 425R so that the green and red conversion units 420G and 420R may also act as a color filter.

In an exemplary embodiment, blue light incident on the green conversion unit 420G may be converted to green light by the green wavelength shifter 431G, and the green light may be transmitted through the green conversion unit 420G to then be emitted outwards. On the other hand, the blue light that fails to be converted to the green light after being incident onto the green conversion unit 420G may not be transmitted through the green conversion unit 420G. As a result, the green light emitted from the green conversion unit 420G may have improved purity.

Similarly, blue light incident on the red conversion unit 420R may be converted to red light by the red wavelength shifter 431R, and the red light may be transmitted through the red conversion unit 420R to then be emitted outwards. On the other hand, the blue light that fails to be converted to the red light after being incident onto the red conversion unit 420R may not be transmitted through the red conversion unit 420R. As a result, the red light emitted from the red conversion unit 420R may have improved purity.

Meanwhile, the blue transmission unit 420B may not include the photonic crystal layers, but embodiments are not limited thereto. The blue transmission unit 420B may include the photonic crystal layers that transmit blue light so as to improve color purity of blue pixels of the LCD 101.

The color conversion substrate 400 illustrated in FIG. 4 may be disposed on the substrate 410, and may include a black matrix 440 configured to partition the green and red conversion units 420G and 420R into pixels, and/or partition the blue conversion unit 420B (which may not contain any elements) into pixels.

Figure 6:
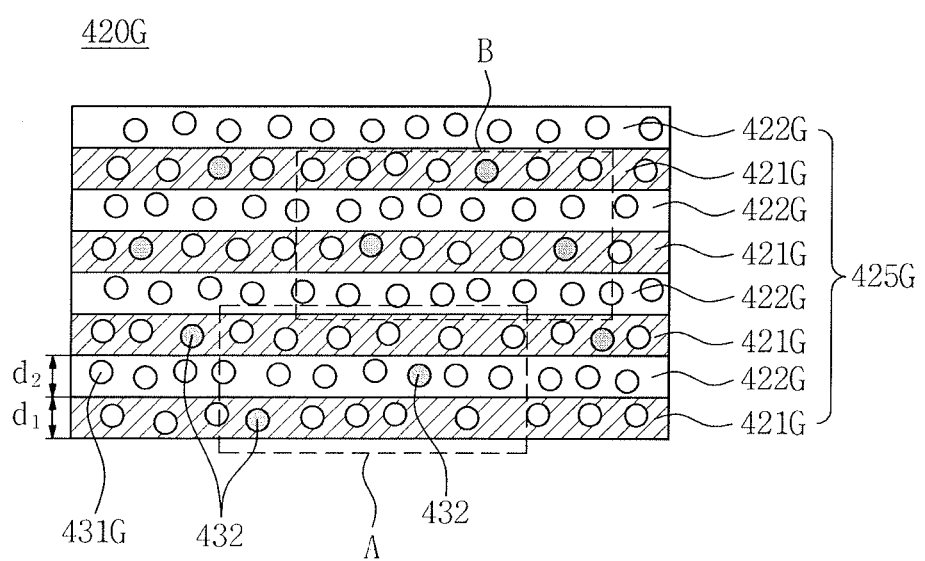
FIG. 6 illustrates a cross-sectional view of an exemplary embodiment of a green conversion unit.

FIG. 6 is a cross-sectional view of an exemplary embodiment of the green conversion unit 420G. The green conversion unit 420G illustrated in FIG. 6 may further include light scatterers 432 dispersed, e.g., randomly dispersed, in the photonic crystal layer 425G. The light scatterers may be in at least one of up to all of the layers 421G, 422G of photonic crystal layer 425G and be in at least one of up to all of layers 421R, 422R of the photonic crystal layer 425R. A known light scattering agent generally used in the art may be utilized as the light scatterer 432.

The light scatterer 432 may change a path of light that is incident onto the green conversion unit 420G or that is converted in the green conversion unit 420G.

Figure 7A:
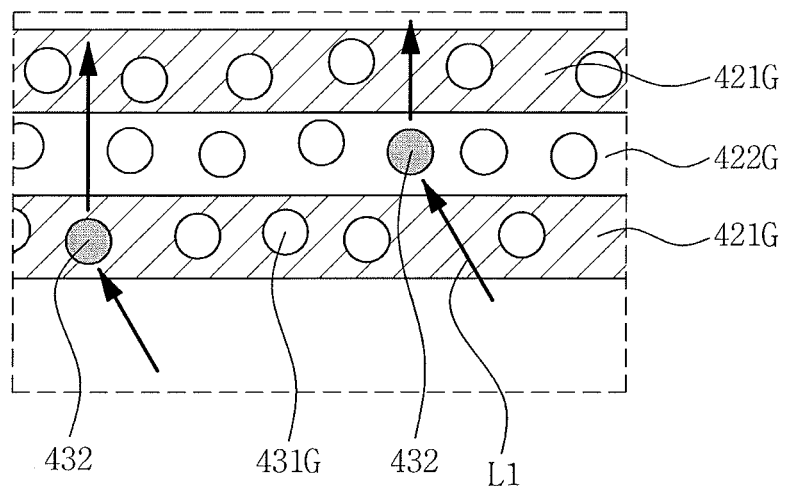
FIGS. 7A and 7B illustrate enlarged views of parts A and B of FIG. 6.
Figure 7B:
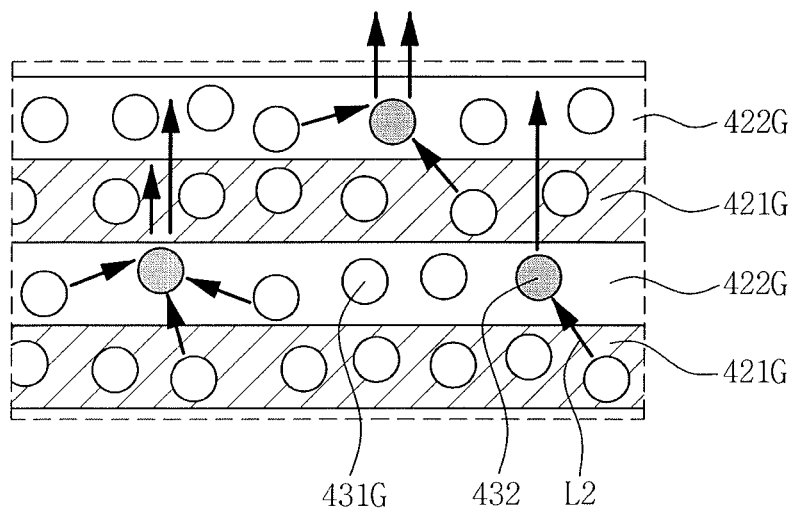

FIGS. 7A and 7B are enlarged views of parts A and B of FIG. 6.

In detail, FIG. 7A illustrates a path of blue light L1 incident on the green conversion unit 420G. The blue light L1 incident on the green conversion unit 420G may be dispersed by the light scatterer 432. Accordingly, the blue light L1 is very likely to interact with the green wavelength shifter 431G, thereby increasing color conversion efficiency.

FIG. 7B illustrates a path of green light L2 that is converted to green by the green wavelength shifter 431G. The green light L2 may interact with the light scatterer 432 in the green conversion unit 420G such that the path of the green light L2 may change. Accordingly, more light incident on the green conversion unit 420G is likely to satisfy Equations 2 and 3 in the green region, thereby increasing efficiency in emission of the green light L2.

The first exemplary embodiment has been described by focusing on the LCD until now. The color conversion substrate 400 according to the first exemplary embodiment may also be applied to an organic light emitting diode (OLED) display. For example, the color conversion substrate 400 may be disposed on an OLED display panel that includes a substrate, a first electrode on the substrate, an organic light emitting layer on the first electrode, and a second electrode on the organic light emitting layer such that the OLED display may be manufactured.

In this case, the organic light emitting layer may emit blue light, and may also emit white light.

Figure 8:
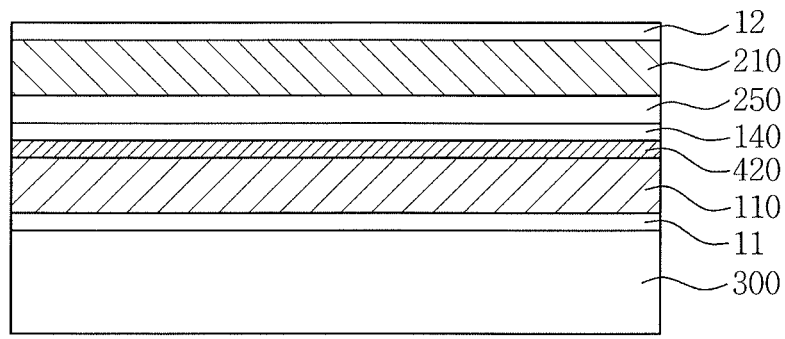
FIG. 8 illustrates a schematic diagram of a liquid crystal display according to a second exemplary embodiment.

FIG. 8 is a schematic diagram illustrating an LCD 102 according to a second exemplary embodiment. Descriptions of the components described according to the first exemplary embodiment will be omitted below to avoid repetition.

In the second exemplary embodiment, the LCD 102 includes the color conversion layer 420 on the first substrate 110. The TFT layer 140 may be disposed on the color conversion layer 420. The liquid crystal layer 250 may be interposed between the TFT layer 140 on the first substrate 110 and the second substrate 210. The black matrix (not shown) may be disposed on the first substrate 110 or the second substrate 210.

The color conversion layer 420 according to the second exemplary embodiment may also be applied to the OLED display. For example, the OLED display may include a substrate, a first electrode on the substrate, an organic light emitting layer on the first electrode and a second electrode on the organic light emitting layer. The color conversion layer 420 may be between the substrate and the first electrode of the OLED display. Also, the color conversion layer 420 may be on the opposite surface of the substrate on which the first electrode is disposed.

Figure 9:
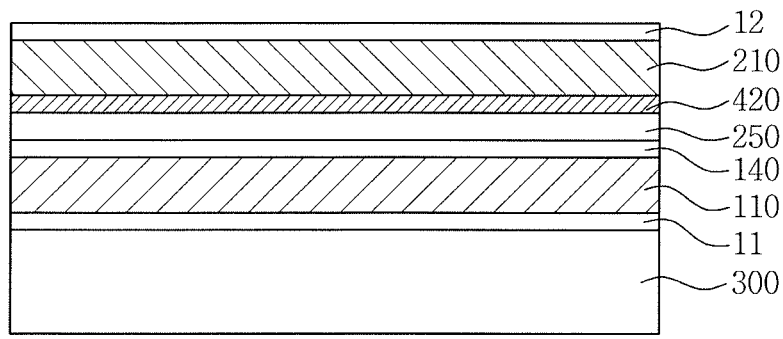
FIG. 9 illustrates a schematic diagram illustrating a liquid crystal display according to a third exemplary embodiment.

FIG. 9 is a schematic diagram illustrating an LCD 103 according to a third exemplary embodiment.

In the third exemplary embodiment according, the LCD 103 includes the color conversion layer 420 on the second substrate 210. The TFT layer 140 may be disposed on the first substrate 110. The liquid crystal layer 250 may be interposed between the TFT layer 140 on the first substrate 110 and the color conversion layer 420 on the second substrate 210. The black matrix (not shown) may be disposed on the first substrate 110 or the second substrate 210.

The color conversion layer 420 according to the third exemplary embodiment may also be applied to the OLED display. For example, the OLED display may include a substrate, a first electrode on the substrate, an organic light emitting layer on the first electrode, a second electrode on the organic light emitting layer, and a protective substrate on the second electrode, and the color conversion layer 420 may be disposed on the protective substrate of the OLED display.

Figure 10:
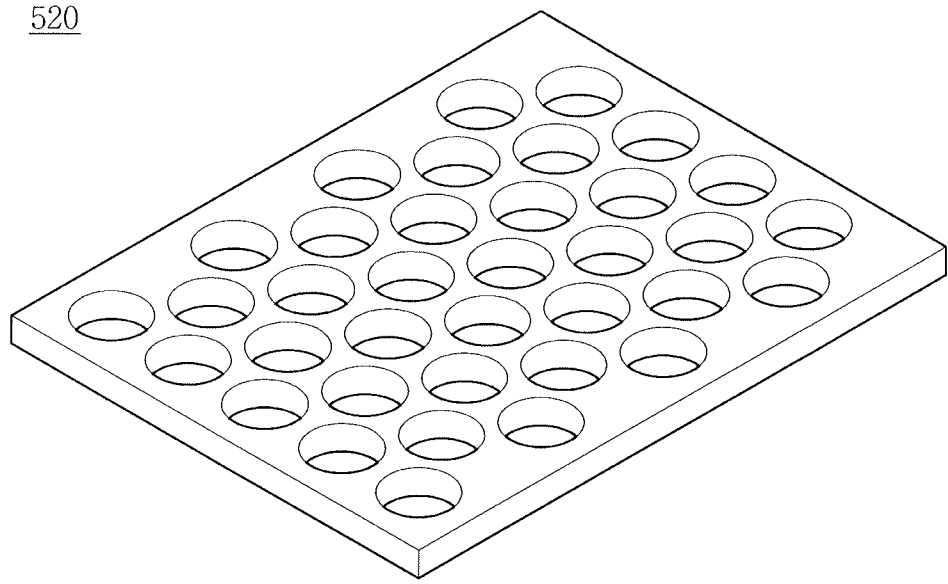
FIG. 10 illustrates a perspective view of an exemplary embodiment of a two-dimensional photonic crystal.

FIG. 10 is a perspective view of an exemplary embodiment of a two-dimensional photonic crystal 520.

The two-dimensional photonic crystal 520 illustrated in FIG. 10 may have a structure of a two-dimensional pattern in which holes are regularly formed in a layer serving as a substrate. The pattern may enable reflection of light of a specified wavelength band or may effectively prevent light incident on the photonic crystal from leaking out.

In a fourth exemplary embodiment, an LCD includes the color conversion layer 420 that has the two-dimensional photonic crystal 520.

The LCD using blue light as a light source has been described hereinabove, but the embodiments is not limited thereto. LCDs using white light as the light source may also be included in exemplary embodiments.

In this case, the color conversion layer may include a green conversion unit that absorbs white light and emits green light, a red conversion unit that absorbs white light and emits red light, and a blue conversion unit that absorbs white light and emits blue light. The green conversion unit may include a green wavelength shifter that absorbs white light and emits green light, the red conversion unit may include a red wavelength shifter that absorbs white light and emits red light, and the blue conversion unit may include a blue wavelength shifter that absorbs white light and emits blue light. A photonic crystal layer of the green conversion unit may transmit only green light, a photonic crystal layer of the red conversion unit may transmit only red light, and a photonic crystal layer of the blue conversion unit may transmit only blue light.

One or more exemplary embodiments is directed toward a display device including a color conversion layer with improved efficiency in color conversion.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a substrate; and
   a plurality of color conversion units on the substrate,
   wherein the plurality of color conversion units includes a green color conversion unit to absorb blue light and emit green light, and a red color conversion unit to, absorb blue light and emit red light;
   wherein each of the green color conversion unit and the red color conversion unit includes:
      a photonic crystal layer including photonic crystals having periodicity in a single direction in which two layers having different refractive indices alternately stacked, the two layers including a first layer having a first refractive index and a second layer having a second refractive index; and
      a wavelength shifter dispersed in both the first and second layers
      when the first layer has a thickness of d1 and a refractive index of n1, and a wavelength of light emitted from the photonic crystal layer is λ, the following equation is satisfied: n1×d1=m1×(λ/2), where m1 is a natural number; and
      when the second layer has a thickness of d2 and a refractive index of n2, and a wavelength of light emitted from the photonic crystal layer is λ, the following equation is satisfied: n2×d2=m2×(λ/2), where m2 is a natural number.

2. The display device as claimed in claim 1, further comprising a black matrix to partition the green color conversion unit and the red color conversion unit into pixels.

3. The display device as claimed in claim 1, wherein the wavelength shifter is a phosphor or a quantum dot (QD).

4. The display device as claimed in claim 1, wherein the two layers include:
   the first layer has the first refractive index in a range of 1.3 to 1.9; and
   the second layer has the second refractive index in a range of 1.5 to 2.5.

5. The display device as claimed in claim 1, further includes a light scatterer dispersed in at least one of the two layers.

6. The display device as claimed in claim 5, wherein the light scatterer is randomly dispersed.

7. The display device as claimed in claim 1, further comprising a thin film transistor layer on the color conversion units.

8. The display device as claimed in claim 1, wherein each of the pluraltiy of color conversion units is designed for a particular wavelength range and each layer therein has a refractive index n and thickness d that satisifies the following equation:

$$\lambda=2(n\times d)/m$$

where m is natural number and λ is within the particular wavelength range.

9. The display device as claimed in claim 1, wherein the wavelength shifter is dispersed in both of the two layers.

10. A liquid crystal display, comprising:
a first substrate;
a plurality of color conversion units on the first substrate;
a second substrate opposite the first substrate; and
a liquid crystal layer between the first and second substrates,
wherein the plurality of color conversion units includes a green color conversion unit to absorb blue light and emit green light; and a red color conversion unit to absorb blue light and emit red light;
wherein each of the green color conversion unit and the red color conversion unit includes:
  a photonic crystal layer including photonic crystals having periodicity in a single direction in which two layers having different refractive indices alternately stacked, the two layers including a first layer having a first refractive index and a second layer having a second refractive index; and
  a wavelength shifter dispersed in both the first and layers,
  when the first layer has a thickness of d1 and a refractive index of n1, and a wavelength of light emitted from the photonic crystal layer is λ, the following equation is satisfied: n1×d1=m1×(λ/2), where m1 is a natural number; and
  when the second layer has a thickness of d2 and a refractive index of n2, and a wavelength of light emitted from the photonic crystal layer is λ, the following equation is satisfied: n2×d2=m2×(λ/2), where m2 is a natural number.

11. The liquid crystal display as claimed in claim 10, further comprising a black matrix on the first substrate, the black matrix to partition the green color conversion unit and the red color conversion unit into pixels.

12. The liquid crystal display as claimed in claim 10, wherein the wavelength shifter is a phosphor or a quantum dot (QD).

13. The liquid crystal display as claimed in claim 10, wherein the two layers include:
the first layer has the first refractive index in a range of 1.3 to 1.9; and
the second layer has the second refractive index in a range of 1.5 to 2.5.

14. The liquid crystal display as claimed in claim 10, further comprising a light scatterer dispersed in the photonic crystal layer.

15. The liquid crystal display as claimed in claim 10, further comprising a thin film transistor layer on the color conversion units.

16. The liquid crystal display as claimed in claim 10, wherein each of the pluraltiy of color conversion units is designed for a particular wavelength range and each layer therein has a refractive index n and thickness d that satisifies the following equation:

$$\lambda=2(n\times d)/m$$

where m is natural number and λ is within the particular wavelength range.

17. The liquid crystal display as claimed in claim 10, wherein the wavelength shifter is dispersed in both of the two layers.

* * * * *